(12) United States Patent
Lee

(10) Patent No.: US 6,779,227 B2
(45) Date of Patent: Aug. 24, 2004

(54) MULTIPLE FUNCTIONAL VACUUM CLEANER

(75) Inventor: Wen-Sung Lee, Taichung (TW)

(73) Assignee: Leh Chu Enterprise Co., Ltd., Taichung (TW)

( * ) Notice: Subject to any disclaimer, the term of this patent is extended or adjusted under 35 U.S.C. 154(b) by 307 days.

(21) Appl. No.: 10/066,537

(22) Filed: Feb. 4, 2002

(65) Prior Publication Data

US 2003/0145417 A1 Aug. 7, 2003

(51) Int. Cl.[7] ................................................. A47L 9/30
(52) U.S. Cl. ........................... 15/324; 15/328; 15/339; 15/344
(58) Field of Search .................. 15/324, 339, 328, 15/344, 327

(56) References Cited

U.S. PATENT DOCUMENTS

| | | | | |
|---|---|---|---|---|
| 4,513,470 A | * | 4/1985 | Toya | 15/328 |
| 4,636,230 A | * | 1/1987 | Fan | 15/328 |
| 4,656,687 A | * | 4/1987 | Wei | 15/324 |
| 5,560,076 A | * | 10/1996 | Leung | 15/339 |
| 6,094,773 A | * | 8/2000 | Krentz et al. | 15/344 |

\* cited by examiner

Primary Examiner—Theresa T. Snider
(74) Attorney, Agent, or Firm—Charles E. Baxley

(57) ABSTRACT

A multiple functional vacuum cleaner has a main casing, a head casing disposed on the main casing, a lower container disposed on the main casing, a handle connected to the main casing and the head casing, a press button, and a spring. The head casing has a front mouth, and a rear insertion plate. A nozzle is connected to the front mouth. A dust extractor fan is disposed in the main casing. An inflator device is disposed in the main casing. The main casing has an upper front chamber, a rear opening, and a rear inner flange. The upper front chamber of the main casing receives the press button and the spring. An illuminator device is disposed in a rear portion of the main casing.

4 Claims, 7 Drawing Sheets

MULTIPLE FUNCTIONAL VACUUM CLEANER

BACKGROUND OF THE INVENTION

The present invention relates to a multiple functional vacuum cleaner. More particularly, the present invention relates to a multiple functional vacuum cleaner for a vehicle.

A conventional vacuum cleaner cannot be converted into a tire inflator. A conventional vacuum cleaner cannot be converted into an illuminator device, either.

SUMMARY OF THE INVENTION

An object of the present invention is to provide a multiple functional vacuum cleaner which is used as a vehicle vacuum cleaner.

Another object of the present invention is to provide a multiple functional vacuum cleaner which is used as a tire inflator.

Another object of the present invention is to provide a multiple functional vacuum cleaner which is used as an illuminator device.

Accordingly, a multiple functional vacuum cleaner comprises a main casing, a head casing disposed on a front portion of the main casing, a lower container disposed on a bottom of the main casing, a handle connected to the main casing and the head casing, a press button movably mounted on the main casing, and a spring biased between the press button and the main casing. The head casing has a front portion formed with a front mouth, and a rear portion formed with a rear insertion plate located adjacent to the front portion of the main casing. A soft plastic pad is mounted in the head casing and located adjacent to the front mouth. A filter net is mounted in the head casing and located adjacent to the rear insertion plate. A nozzle is connected to the front mouth. The nozzle has an end recess. The front mouth has a click block inserted in the end recess of the nozzle. A dust extractor fan is disposed in the front portion of the main casing and located adjacent to the head casing. A cell is disposed in the main casing and located adjacent to the lower container. An inflator device is disposed in the main casing. The main casing has a plurality of radiation vent holes, a plurality of bottom grooves, a socket aligning with the cell, an upper front chamber, a lower front groove, a rear opening, and a rear inner flange. The rear insertion plate of the head casing is inserted in the lower front groove of the main casing. The upper front chamber of the main casing receives the press button and the spring. A lower recess is formed in the head casing The press button has a lower positioning bar inserted in the lower recess of the head casing. The lower container has a plurality of upper connection blocks inserted in the bottom grooves of the main casing. An illuminator device is disposed in a rear portion of the main casing. The illuminator device has a lamp, an inner shade surrounding the lamp, a protective shade covering the inner shade, and a transparent shade covering the rear opening of the main casing. The transparent shade has an outer flange to engage with the rear inner flange of the main casing.

BRIEF DESCRIPTION OF THE DRAWINGS

FIG. 3A is a schematic view illustrating a press button engaging with a head casing;

FIG. 4A is a sectional view taken along line 4A—4A in FIG. 4;

DETAILED DESCRIPTION OF THE INVENTION

Figure 1:
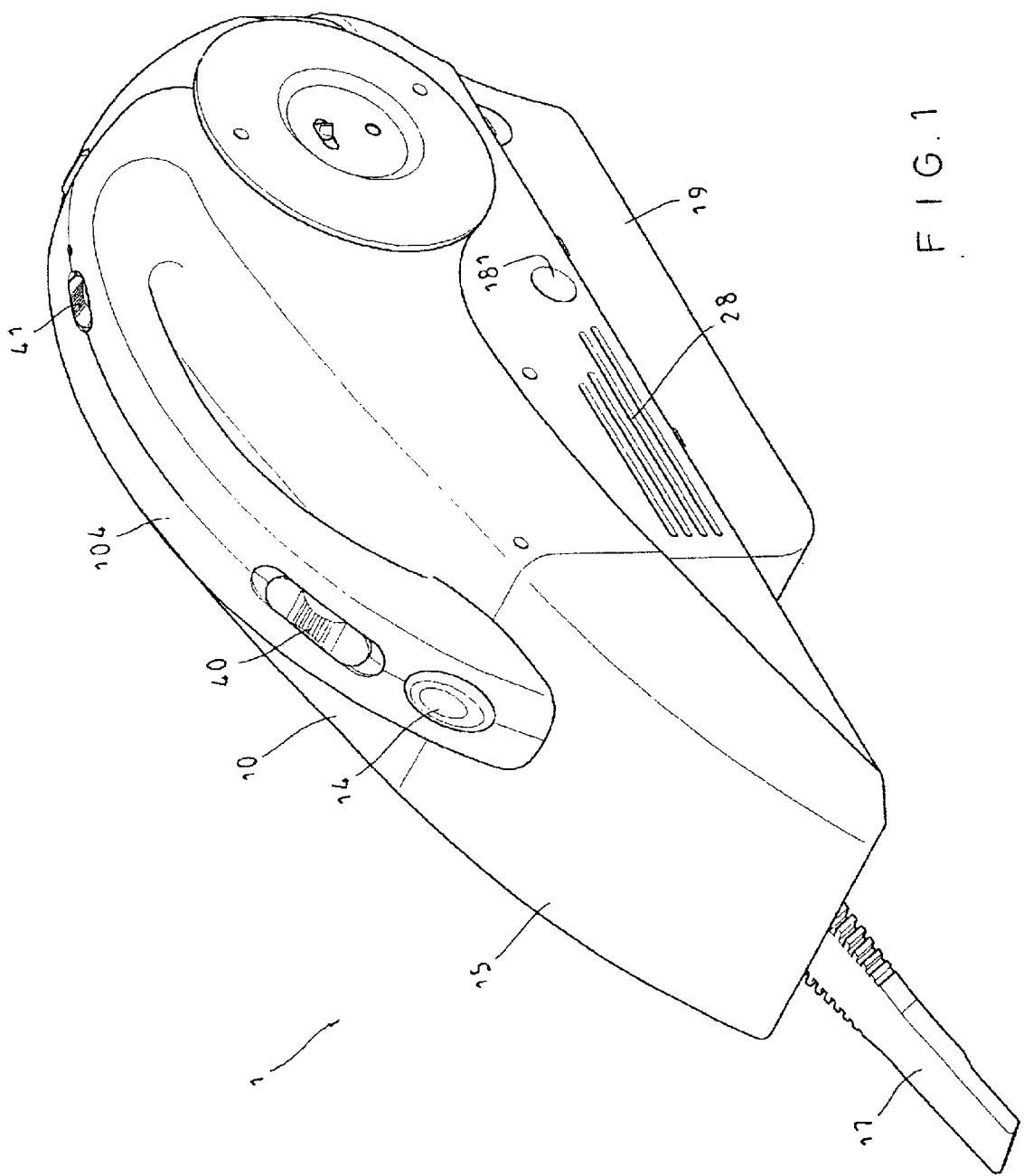
FIG. 1 is a perspective view of a multiple functional vacuum cleaner of a preferred embodiment in accordance with the present invention.
Figure 2:
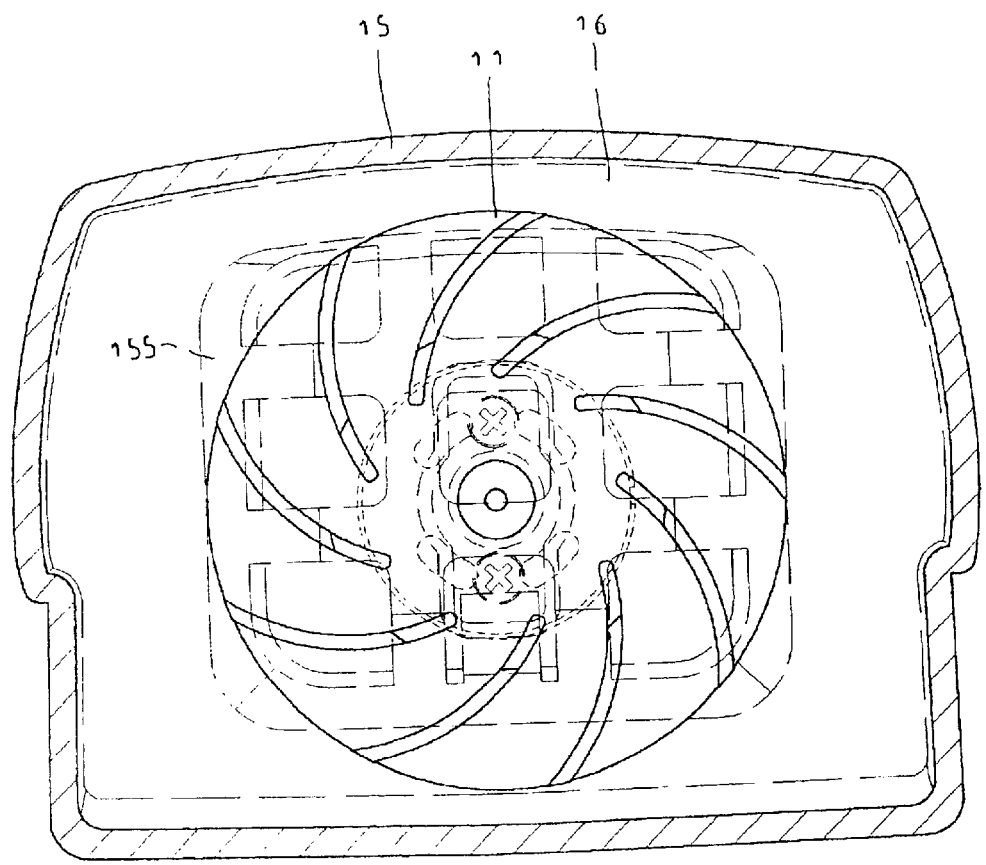
FIG. 2 is a sectional view of a dust extractor fan of a preferred embodiment in accordance with the present invention.
Figure 3:
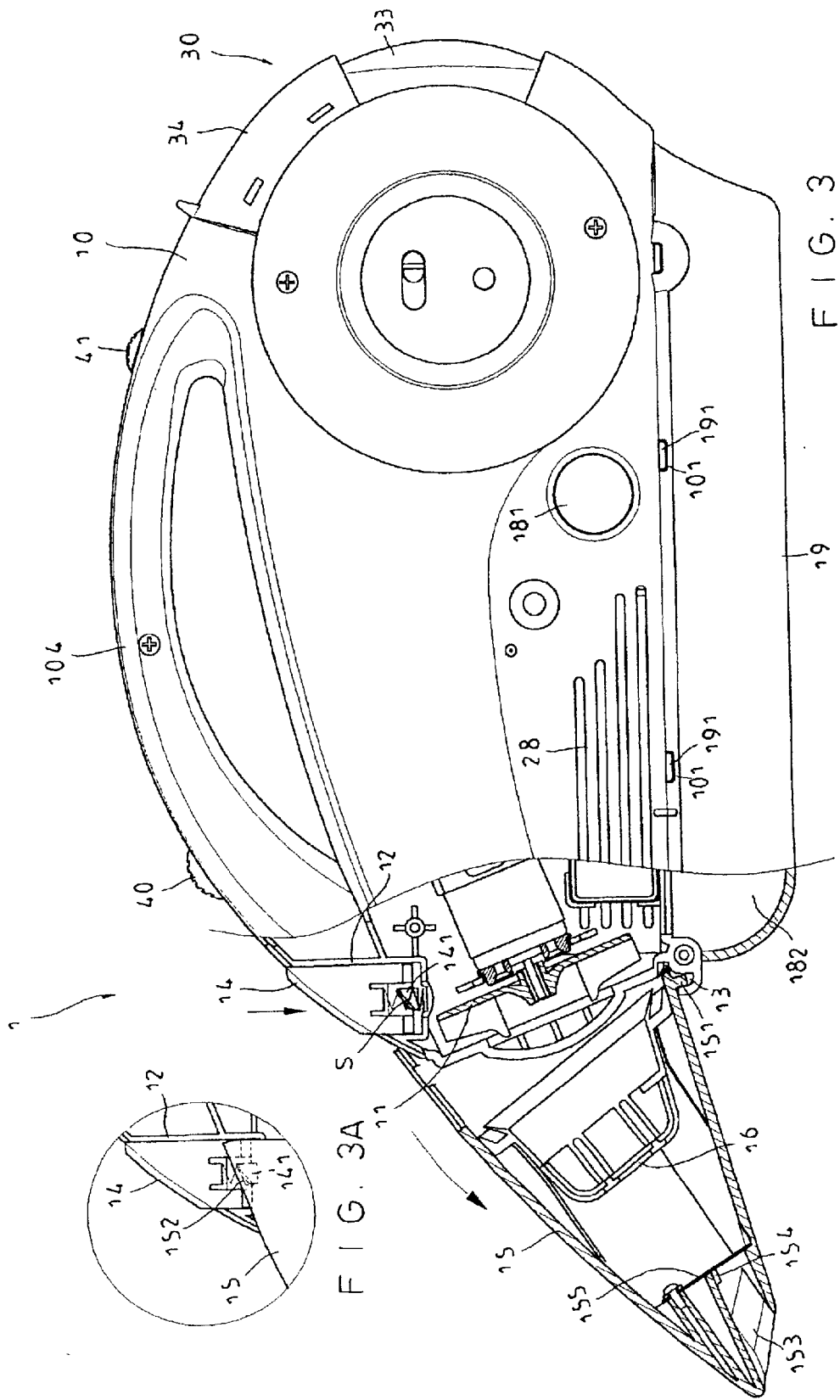
FIG. 3 is a partially sectional view of a multiple functional vacuum cleaner of a preferred embodiment while a head casing is removed.
Figure 4:
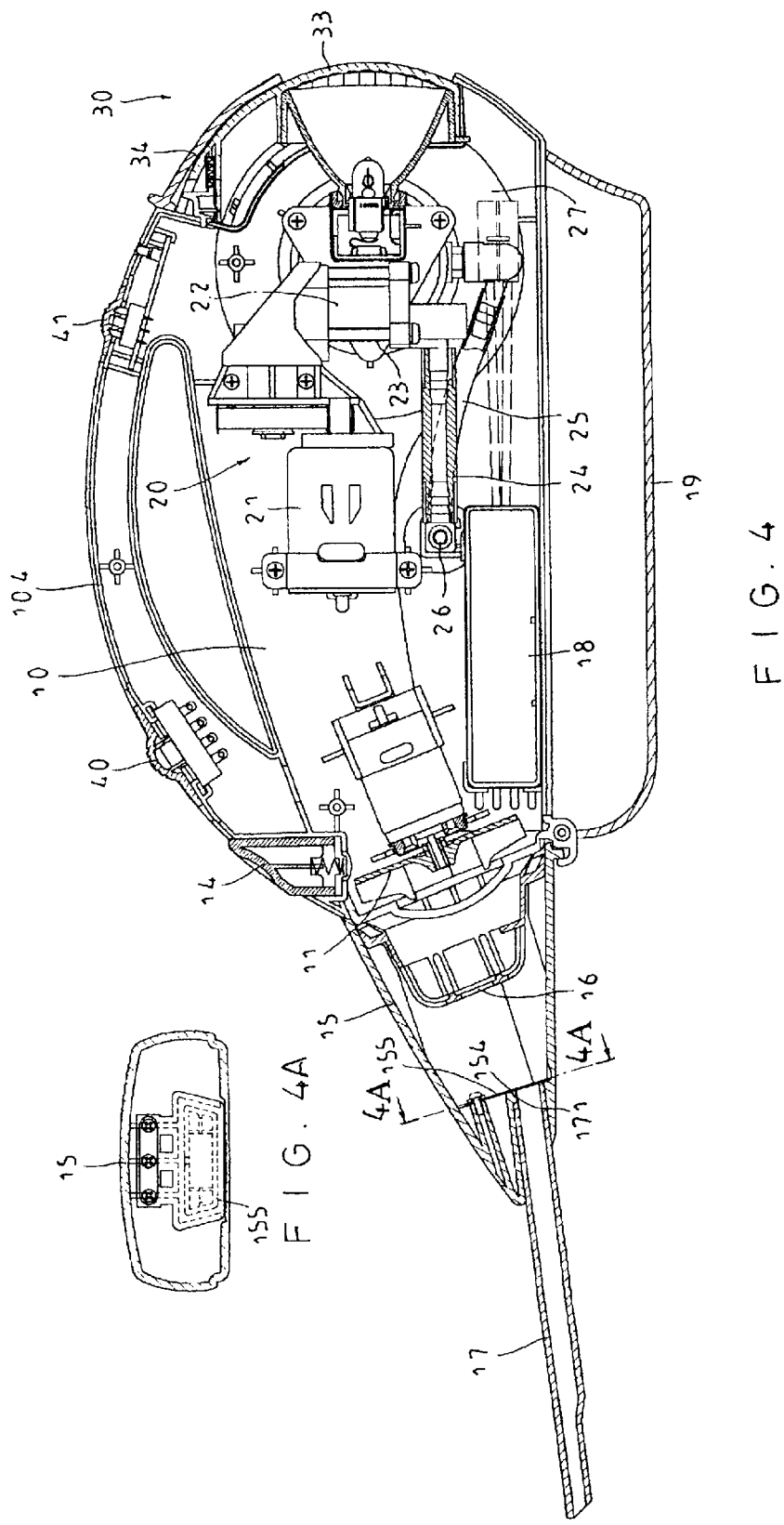
FIG. 4 is a sectional view of a multiple functional vacuum cleaner of a preferred embodiment in accordance with the present invention.
Figure 5:
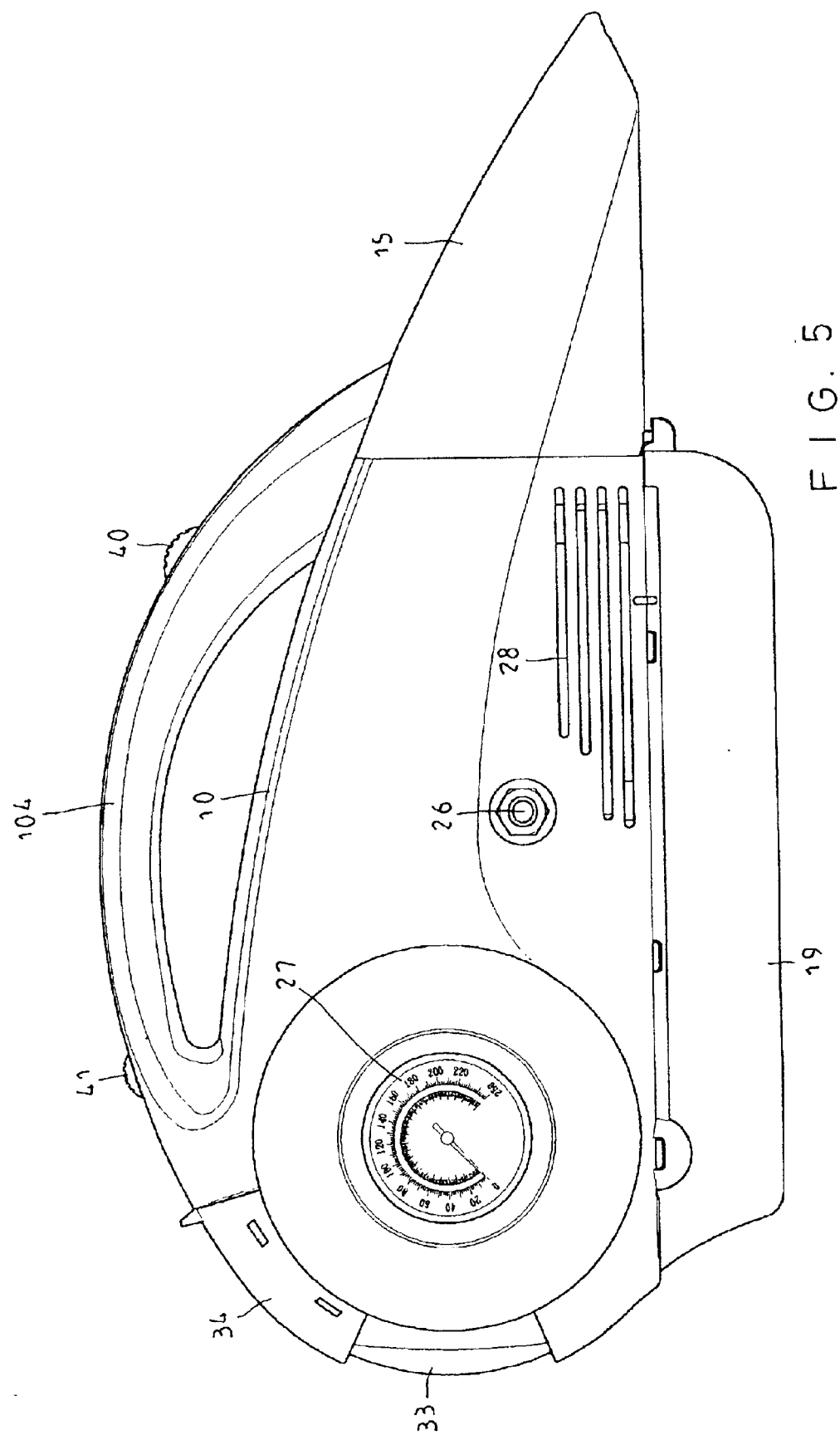
FIG. 5 is an elevational view of a multiple functional vacuum cleaner of a preferred embodiment in accordance with the present invention.
Figure 6:
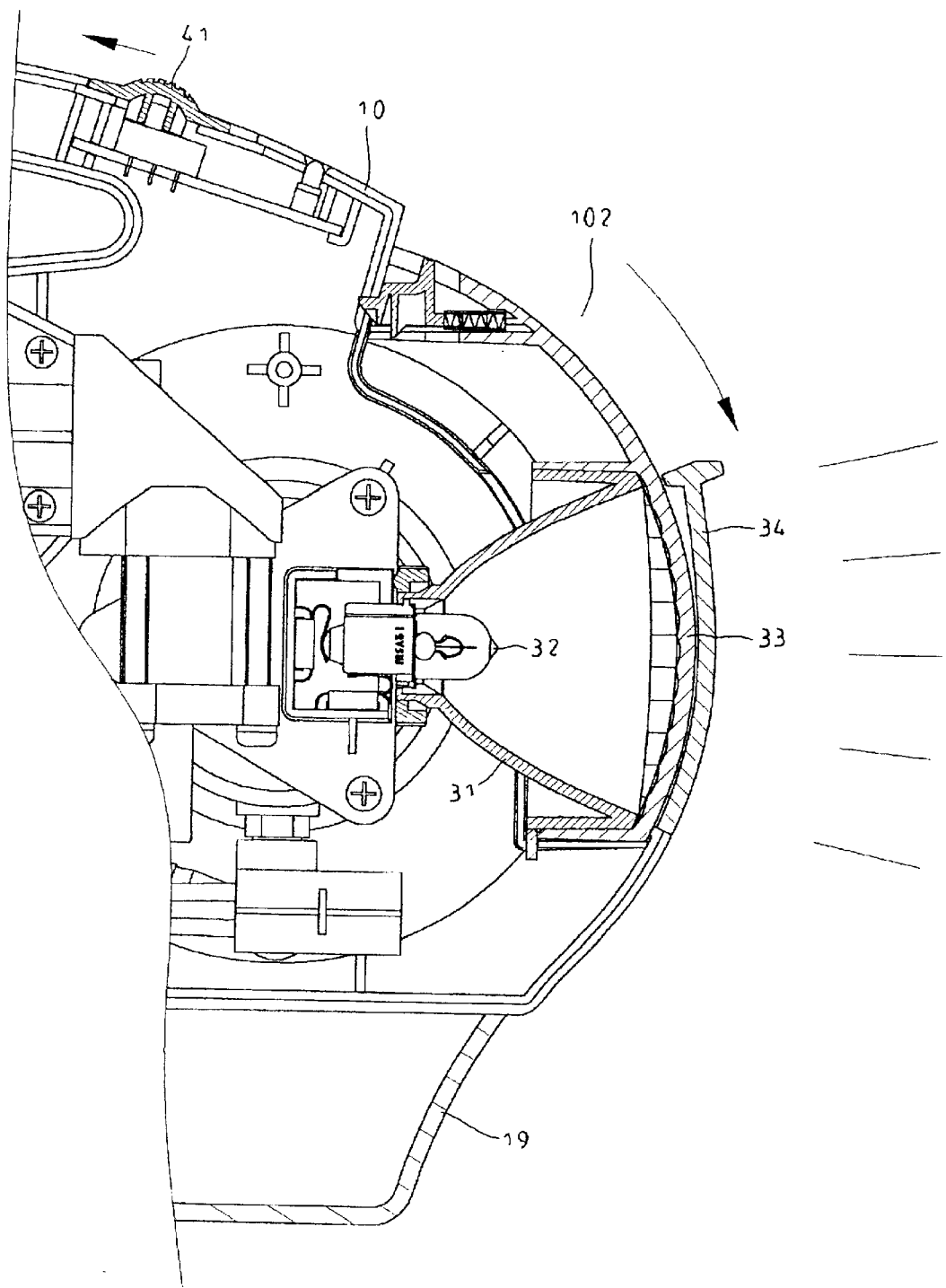
FIG. 6 is a schematic view illustrating a shade is moved downward.
Figure 7:
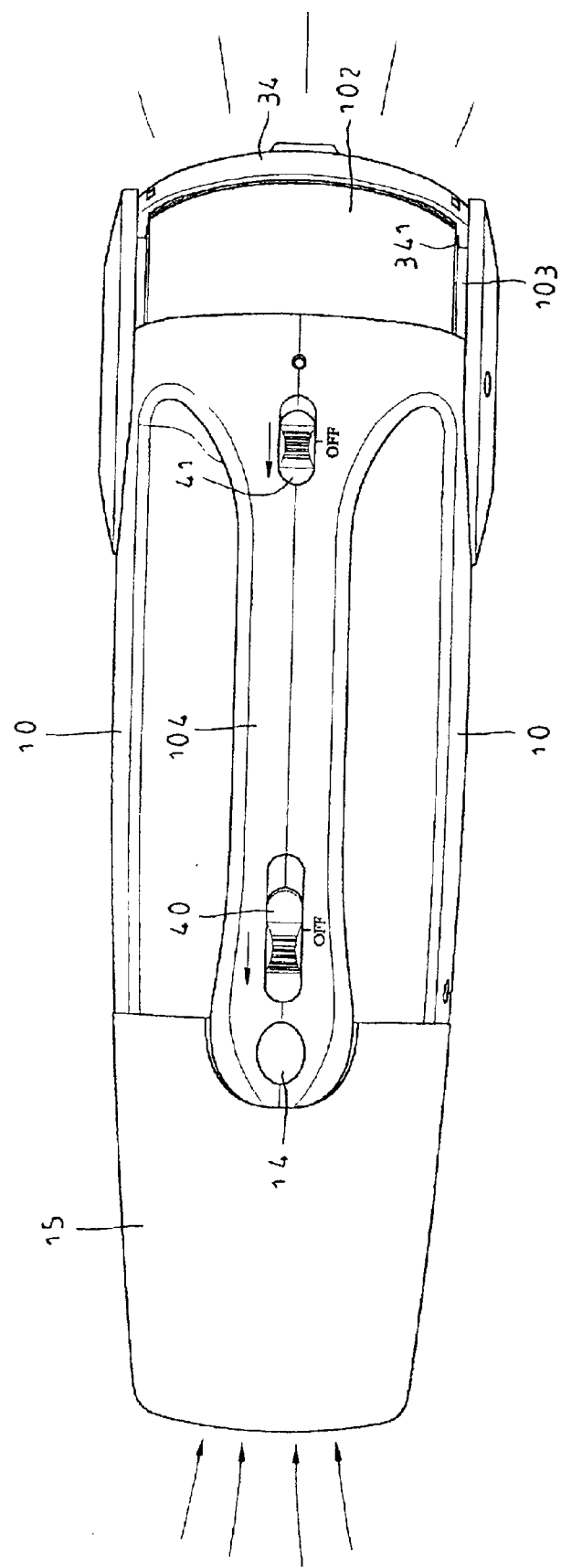
FIG. 7 is a top plan view of a multiple functional vacuum cleaner of a preferred embodiment in accordance with the present invention.

Referring to FIGS. 1 to 7, a multiple functional vacuum cleaner 1 comprises a main casing 10, a head casing 15 disposed on a front portion of the main casing 10, a lower container 19 disposed on a bottom of the main casing 10, a handle 104 connected to the main casing 10 and the head casing 15, a press button 14, and a spring S.

The head casing 15 has a front mouth 153, a soft plastic pad 155, a filter net 16, and a rear insertion plate 151.

A nozzle 17 is connected to the front mouth 153. The nozzle 17 has an end recess 171.

The front mouth 153 has a click block 154 inserted in the end recess 171 of the nozzle 17.

The nozzle 17 contacts the soft plastic pad 155.

A dust extractor fan 11 is disposed in the front portion of the main casing 10.

A cell 18 is disposed in the bottom of the main casing 10.

An inflator device 20 is disposed in the main casing 10.

The inflator device 20 has a motor 21, a pump 23, a piston 22, an inflator hole 26, a tire gauge 27, an air tube 24 connected to the inflator hole 26, an air pipe 25 connected to the tire gauge 27, the motor 21 connected to the piston 22, and the piston 22 connected to the pump 23.

The main casing 10 has a plurality of radiation vent holes 28, a plurality of bottom grooves 101, a socket 181, an upper front chamber 12, a lower front groove 13, a rear opening 102, and a rear inner flange 103.

The rear insertion plate 151 is inserted in the lower front groove 13 of the main casing 10.

The upper front chamber 12 of the main casing 10 receives the press button 14 and the spring S.

The rear insertion plate 151 is inserted in the lower front groove 13 of the main casing 10.

A lower recess 152 is formed in the head casing 15.

The press button 14 has a lower positioning bar 141 inserted in the lower recess 152 of the head casing 15.

When the press button 14 is pressed downward, the lower positioning bar 141 of the press button 14 disengages from the lower recess 152 of the head casing 15 to detach the head casing 15 from the press button 14 and the main casing 10.

The lower container 19 has a plurality of upper connection blocks 191 inserted in the bottom grooves 101 of the main casing 10.

An illuminator device 30 is disposed in a rear portion of the main casing 10.

The illuminator device 30 has a lamp 32, an inner shade 31 surrounding the lamp 32, a protective shade 33 covering the inner shade 31, and a transparent shade 34 covering the rear opening 102 of the main casing 10.

The transparent shade 34 has an outer flange 341 to engage with the rear inner flange 103 of the main casing 10.

A first switch button 40 is disposed on the handle 104 in order to control the dust extractor fan 11.

A second switch button 41 is disposed on the handle 104 in order to control the illuminator device 30.

The invention is not limited to the above embodiment but various modification thereof may be made. Further, various changes in form and detail may be made without departing from the scope of the invention.

I claim:

1. A multiple functional vacuum cleaner comprises:

a main casing, a head casing disposed on a front portion of the main casing, a lower container disposed on a bottom of the main casing, a handle connected to the main casing and the head casing, a press button movably mounted on the main casing, and a spring biased between the press button and the main casing, the head casing having a front portion formed with a front mouth, and a rear portion formed with a rear insertion plate located adjacent to the front portion of the main casing, a soft plastic pad mounted in the head casing and located adjacent to the front mouth, a filter net mounted in the head casing and located adjacent to the rear insertion plate, a nozzle connected to the front mouth, the nozzle having an end recess, the front mouth having a click block inserted in the end recess of the nozzle, a dust extractor fan disposed in the front portion of the main casing and located adjacent to the head casing, a cell disposed in the main casing and located adjacent to the lower container, an inflator device disposed in the main casing, the main casing having a plurality of radiation vent holes, a plurality of bottom grooves, a socket aligning with the cell, an upper front chamber, a lower front groove, a rear opening, and a rear inner flange, the rear insertion plate of the head casing inserted in the lower front groove of the main casing, the upper front chamber of the main casing receiving the press button and the spring, a lower recess formed in the head casing, the press button having a lower positioning bar inserted in the lower recess of the head casing, the lower container having a plurality of upper connection blocks inserted in the bottom grooves of the main casing, an illuminator device disposed in a rear portion of the main casing, the illuminator device having a lamp, an inner shade surrounding the lamp, a protective shade covering the inner shade, and a transparent shade covering the rear opening of the main casing, the transparent shade having an outer flange to engage with the rear inner flange of the main casing.

2. The multiple functional vacuum cleaner as claimed in claim 1, wherein the inflator device has a motor, a pump, a piston, an inflator hole, a tire gauge, an air tube connected to the inflator hole, an air pipe connected to the tire gauge, the motor connected to the piston, and the piston connected to the pump.

3. The multiple functional vacuum cleaner as claimed in claim 1, further comprising a first switch button disposed on the handle to control the dust extractor fan.

4. The multiple functional vacuum cleaner as claimed in claim 1, further comprising a second switch button disposed on the handle to control the illuminator device.

* * * * *